United States Patent
Calciu et al.

(10) Patent No.: US 12,147,528 B2
(45) Date of Patent: Nov. 19, 2024

(54) COHERENCE-BASED ATTACK DETECTION

(71) Applicant: VMware, Inc., Palo Alto, CA (US)

(72) Inventors: Irina Calciu, Palo Alto, CA (US); Andreas Nowatzyk, San Jose, CA (US); Pratap Subrahmanyam, Saratoga, CA (US)

(73) Assignee: VMware LLC, Palo Alto, CA (US)

( * ) Notice: Subject to any disclaimer, the term of this patent is extended or adjusted under 35 U.S.C. 154(b) by 576 days.

(21) Appl. No.: 17/383,342

(22) Filed: Jul. 22, 2021

(65) Prior Publication Data

US 2023/0022096 A1    Jan. 26, 2023

(51) Int. Cl.
*G06F 21/52* (2013.01)
*G06F 9/455* (2018.01)
*G06F 12/0815* (2016.01)
*G06F 12/0891* (2016.01)
*G06F 21/55* (2013.01)

(52) U.S. Cl.
CPC .......... *G06F 21/52* (2013.01); *G06F 9/45558* (2013.01); *G06F 12/0815* (2013.01); *G06F 12/0891* (2013.01); *G06F 21/556* (2013.01); *G06F 2009/45587* (2013.01)

(58) Field of Classification Search
CPC .... G06F 21/52; G06F 21/556; G06F 9/45558; G06F 2009/45587; G06F 12/0815; G06F 12/0891
See application file for complete search history.

(56) References Cited

U.S. PATENT DOCUMENTS

| | | | |
|---|---|---|---|
| 8,161,247 B2* | 4/2012 | Gray | G06F 12/0831 711/146 |
| 10,261,852 B2* | 4/2019 | Benedict | G06F 11/0787 |
| 10,761,984 B2 | 9/2020 | Calciu et al. | |
| 10,795,613 B2* | 10/2020 | Roh | G06F 3/061 |
| 10,922,088 B2* | 2/2021 | Liu | G06F 12/1491 |
| 10,929,295 B2 | 2/2021 | Gandhi et al. | |
| 11,068,400 B2 | 7/2021 | Kolli et al. | |
| 11,372,972 B2* | 6/2022 | Carlson | G06F 3/062 |
| 2020/0034175 A1 | 1/2020 | Calciu et al. | |
| 2020/0034176 A1 | 1/2020 | Calciu et al. | |
| 2020/0034200 A1* | 1/2020 | Calciu | G06F 9/45558 |
| 2020/0034297 A1 | 1/2020 | Calciu et al. | |

(Continued)

OTHER PUBLICATIONS

Chiappetta, M. et al. "Real time detection of cache-based side-channel attacks using hardware performance counters," Applied Soft Computing, 49, 2016, pp. 1162-1174 (15 pages).

(Continued)

*Primary Examiner* — Zachary A. Davis
(74) *Attorney, Agent, or Firm* — Kim & Stewart LLP (57) ABSTRACT

While an application or a virtual machine (VM) is running, a device tracks accesses to cache lines to detect access patterns that indicate security attacks, such as cache-based side channel attacks or row hammer attacks. To enable the device to detect accesses to cache lines, the device is connected to processors via a coherence interconnect, and the application/VM data is stored in a local memory of the device. The device collects the cache lines of the application/VM data that are accessed while the application/VM is running into a buffer and the buffer is analyzed for access patterns that indicate security attacks.

20 Claims, 7 Drawing Sheets

(56) References Cited

U.S. PATENT DOCUMENTS

2020/0242035 A1    7/2020  Kolli et al.
2020/0409711 A1*  12/2020  Constable ........... G06F 9/30145
2022/0108013 A1*   4/2022  Favor ................. G06F 9/30047
2022/0114096 A1*   4/2022  Striramassarma ...... G06F 7/575

OTHER PUBLICATIONS

He, Z. & Lee, R. B. "How secure is your cache against side-channel attacks?" In Proceedings of the 50th Annual IEEE/ACM International Symposium on Microarchitecture (MICRO-50), Oct. 14-18, 2017, Cambridge, MA, USA, pp. 341-353 (13 pages).

Kim, Y. et al. "Flipping bits in memory without accessing them: An experimental study of DRAM disturbance errors," ACM SIGARCH Computer Architecture News, 42(3), Jun. 2014, pp. 361-372 (12 pages).

* cited by examiner

FIG. 7

COHERENCE-BASED ATTACK DETECTION

BACKGROUND

Attacks to a computer system can take several forms. One type of attack is a cache-based side-channel attack in which cache accesses in the computer system are tracked to gain security-critical information. In general, cache-based side-channel attacks are difficult to detect and are not easy to eliminate without affecting performance.

Another type of attack is a row-hammer attack. This type of attack is triggered by employing memory access patterns that rapidly activate the same memory rows numerous times to cause bit changes in neighboring memory cells. As density of memory cells have increased in modern DRAM, row-hammer attacks have become more problematic.

SUMMARY

A method of detecting a security threat in a computer system while an application program is executed on a processor of the computer system, according to an embodiment, includes: storing all data pages of the application program in a local memory of a device that is connected to the processor via a coherence interconnect; during execution of the application program by the processor, monitoring the coherence interconnect for requests to access cache lines of the data pages, and storing addresses of the accessed cache lines in a buffer; and determining that a security threat exists based on contents of the buffer.

Further embodiments include a non-transitory computer-readable storage medium comprising instructions that cause a computer system to carry out the above method, as well as a computer system configured to carry out the above method.

DETAILED DESCRIPTION

One or more embodiments provide a device that tracks accesses to cache lines while an application or a virtual machine (VM) is running to detect access patterns that indicate security attacks, such as such as cache-based side channel attacks or row hammer attacks. To enable the device, e.g., an FPGA, to detect accesses to cache lines, the device is connected to processors via a coherence interconnect, and the application/VM data is stored in a local memory of the device. The device collects the cache lines of the application/VM data that are accessed while the application/VM is running into a buffer and the buffer is analyzed for access patterns that indicate security attacks.

Figure 1A:
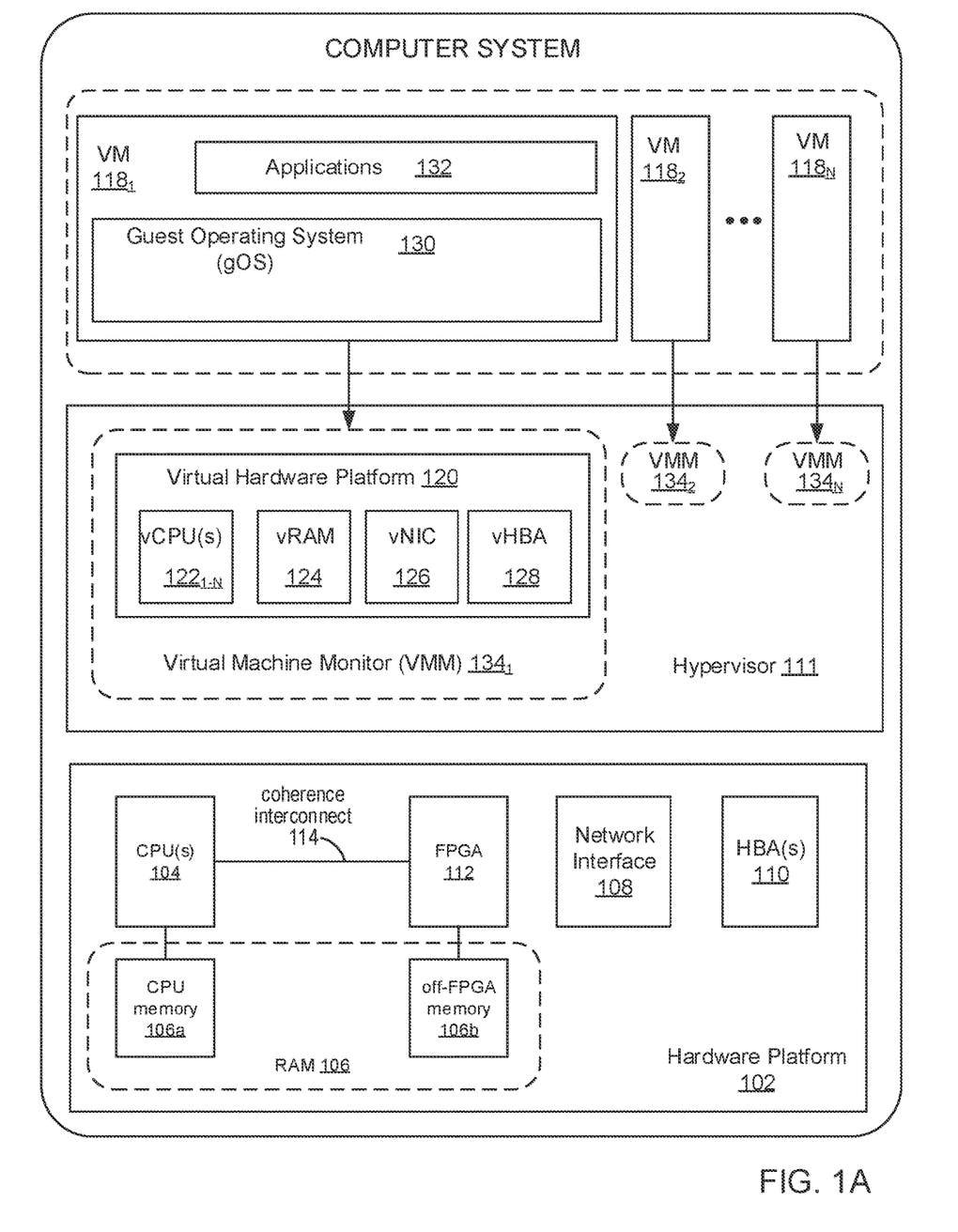
FIG. 1A depicts a block diagram of a computer system that is representative of a virtualized computer architecture in which embodiments may be implemented.

FIG. 1A is a block diagram of a computer system that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware including central processing units (CPUs) 104, random access memory (RAM) 106 as system memory, one or more network interfaces 108 for connecting to a network, and one or more host bus adapters (HBA) 110 for connecting to a storage system. In addition, hardware platform 102 includes a field-programmable gate array (FPGA) 112, which is installed in a CPU socket and communicates with one or more CPUs 104 via coherence interconnect 114. Coherence interconnect 114 may be any point-to-point coherence interconnect between processors, such as the Intel® UltraPath Interconnect (UPI), which is a successor to the Intel® QuickPath Interconnect (QPI), which supports a cache coherence protocol. In another embodiment, coherence interconnect 114 is a Compute Express Link™ (CXL™) operating with CXL.Cache and/or CXL.Mem protocols. Though the following description has the FPGA occupying a CPU socket, the embodiments are not so limited; any arrangement of the FPGA that includes a connection to the coherence interconnect among processors present in computer system 100 is sufficient.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, CA In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual hardware platform that is executed under the control of hypervisor 111, in particular the corresponding VMM $134_1$-$134_N$. For example, virtual hardware devices of VM $118_1$ in virtual hardware platform 120 include one or more virtual CPUs (vCPUs) $122_1$-$122_N$, a virtual random access memory (vRAM) 124, a virtual network interface adapter (vNIC) 126, and virtual HBA (vHBA) 128. Virtual hardware platform 120 supports the installation of a guest operating system (guest OS) 130, on top of which applications 132 are executed in VM $118_1$. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1A may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM includes the hardware emulation components for the virtual machine.

Figure 1B:
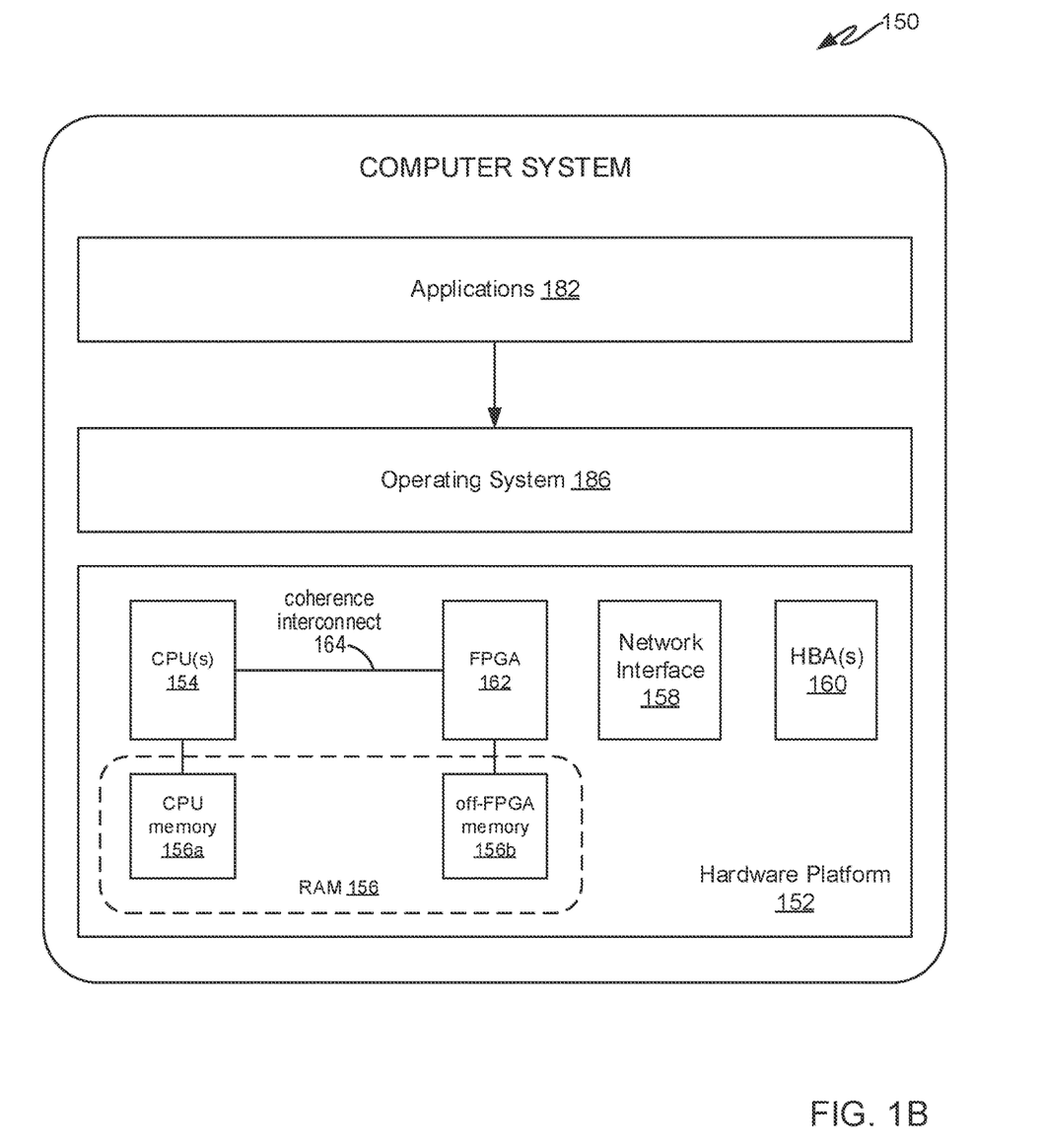
FIG. 1B depicts a block diagram of a computer system that is representative of a non-virtualized computer architecture in which embodiments may be implemented.

FIG. 1B is a block diagram of a computer system that is representative of an alternative computer architecture in which embodiments may be implemented. As illustrated, computer system 150 includes a hardware platform 152 that is similar to hardware platform 102. Hardware platform 152 includes conventional computer hardware components, such as one or more items of processing hardware including central processing units (CPUs) 154, random access memory (RAM) 156 as system memory, one or more network interfaces 158 for connecting to a network, and one or more host bus adapters (HBA) 160 for connecting to a storage system. In addition, hardware platform 152 includes an FPGA 162, which is installed in a CPU socket and communicates with one or more CPUs 154 via coherence interconnect 164. Coherence interconnect 164 may be any point-to-point coherence interconnect between processors such as those identified above for coherence interconnect 114. Though the following description has the FPGA occupying a CPU socket, the embodiments are not so limited; any arrangement of the FPGA that includes a connection to the coherence interconnect among processors present in computer system 150 is sufficient. Hardware platform 152 supports the installation of an operating system 186, on top of which applications 182 are executed in computer system 150. Examples of an operating system 186 include any of the well-known commodity operating systems, such as the Microsoft Windows® operating system, the Linux® operating system, and the like.

Figure 2:
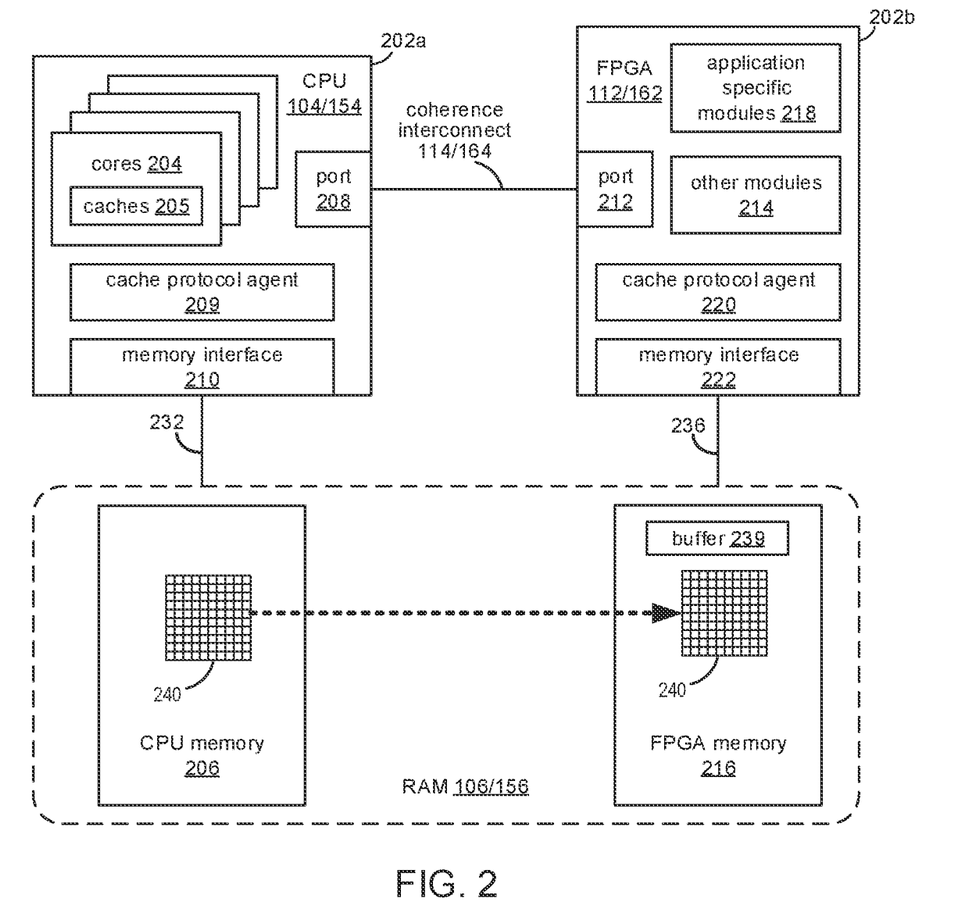
FIG. 2 depicts a block diagram of a pair of CPU sockets for a CPU and an FPGA, in an embodiment.

FIG. 2 depicts a block diagram of a pair of CPU sockets, a first socket 202*a* for a representative one of CPUs 104 (or CPUs 154), and a second socket 202*b* for an FPGA (e.g., FPGA 112 or FPGA 162). The CPU includes one or more processing cores 204, caches 205 for cores 204 (often implemented as a hierarchy of multiple cache levels), a cache protocol agent 209 for enforcing the cache coherence protocol, a communications port 208 connected to a coherence interconnect (e.g., coherence interconnect 114 or coherence interconnect 164), and a memory interface 210 connected via memory bus 232 to CPU memory 206, which is allocated from RAM 106 or RAM 156. FPGA 112, 162 is configured with one or more application-specific modules 218, a cache protocol agent 220 for enforcing the cache coherence protocol, a communications port 212 connected to coherence interconnect 114, 164, and a memory interface 222 connected via memory bus 236 to FPGA memory 216, which is allocated from RAM 106 or RAM 156. Other modules 214, whose operations are unrelated to application-specific modules 218, also may be configured in FPGA 112. In one embodiment, each CPU socket, 202*a*, 202*b*, represents a separate Non-Uniform Memory Access (NUMA) domain.

As is well known, caches 205 are used to reduce the average cost to access data from memory. Data is transferred between CPU memory 206 and caches 205 in blocks of fixed size, called cache lines or cache blocks. When a cache line is copied from CPU memory 206 into caches 205, a cache entry is created, which includes both the copied data and the requested memory location (called a tag). When the CPU requests to read or write a location in CPU memory 206, caches 205 first check for a corresponding entry contained therein. That is, caches 205 search for the contents of the requested memory location in any cache lines that might contain that address. If the CPU finds that the memory location resides in caches 205, a cache hit has occurred, and the CPU immediately reads or writes the data in the cache line. However, if the CPU does not find the memory location in caches 205, a cache miss has occurred. For a cache miss, caches 205 allocate a new entry and copy data from CPU memory 206. The request is then fulfilled from the contents of caches 205.

Communication ports 208, 212, mentioned above, support a coherence protocol, which is designed to maintain cache coherence in a system with many processors, each having its own cache or caches. With the FPGA residing in one socket 202*b* of the CPU sockets and having its own communication port 212 that supports the coherence protocol, the FPGA can monitor and participate in the coherency protocol that keeps the processor caches coherent.

Cache coherence on the coherence interconnect is maintained according to a standard coherence protocol, such as modified, exclusive, shared, invalid (MESI) protocol or modified, exclusive, shared, invalid, forwarded (MESIF) protocol. In these protocols, cache lines marked invalid signify that the cache line has invalid data, and fresh data must be brought into caches 205 from CPU memory 206. Cache lines marked exclusive, shared, and forwarded (in the MESIF protocol) all signify that the cache line has valid data, but the cache line is clean (not modified), so the cache line can be discarded from the cache without writing data of the cache line back to CPU memory 206. A cache line marked as modified signifies the cache line is modified or dirty, and data of the cache line must be written back to CPU memory 206 before the cache line is discarded from caches 205.

Each cache protocol agent can initiate and respond to transactions on the coherence interconnect by sending and receiving messages on the coherence interconnect. In the embodiments illustrated herein, cache protocol agent 209 cooperates with cache protocol agent 220 by sending messages, including broadcast messages, over the coherence interconnect. In the protocol, one of the cache protocol agents is an owner of a set of cache lines and contains information regarding those cache lines. The other cache protocol agents send messages to the owner agent requesting a cache line or to find the status of the cache line owned by the owner agent. The owner agent may service the request directly or request that another cache protocol agent satisfy the request.

When the CPU accesses a cache line that is not in its caches 205, at any level of the cache hierarchy, it is cache protocol agent 209 of the CPU that requests the cache line from CPU memory 206. Thus, cache protocol agent 209 in CPU 104 issues a load cache line transaction on coherence interconnect 114. The transaction can be 'Load Shared' for sharing the cache line or 'Load Exclusive' for cache lines that will be modified. A cache line that is loaded as 'Shared' means that the line probably will not be modified. In contrast, a cache line that is loaded as 'Exclusive' is considered potentially dirty because it is not certain the cache line will be modified. When a cache line gets evicted from caches 205 to CPU memory 206, if it is modified, it must be written back to CPU memory 206 from which it originated. The operation of writing the cache line is performed on coherence interconnect 114 as a write-back transaction and can be monitored for tracking dirty cache lines. In the case of a write-back transaction, the cache line is actually dirty rather than potentially dirty. In the description that follows, a writeback transaction is converted to and handled as a message, 'WB_Data CL.'

To confirm whether a cache line is dirty or not, a cache protocol agent, such as cache protocol agent 220 in the FPGA, can snoop the cache line in accordance with the coherence interconnect protocol. If the cache line is dirty, the snoop triggers a write-back transaction, thereby exposing the dirty cache line that was residing in the processor cache. Cache protocol agents 209 and 220 also have information regarding the cache lines that are resident in the processor caches. This information is accessible via coherence interconnect 114.

Embodiments employ the FPGA to track accesses to data pages of an application program (e.g., VM 118 or application 182), to detect access patterns that indicate security attacks. To enable to FPGA to carry out these tasks, buffer 239 is configured in FPGA memory 216 for storing cache lines of data pages of the application program that are accessed. In addition, system software (e.g., hypervisor 111 or operating system 186) moves data pages 240 of the application program from CPU memory 206 to FPGA memory 216.

Figure 3:
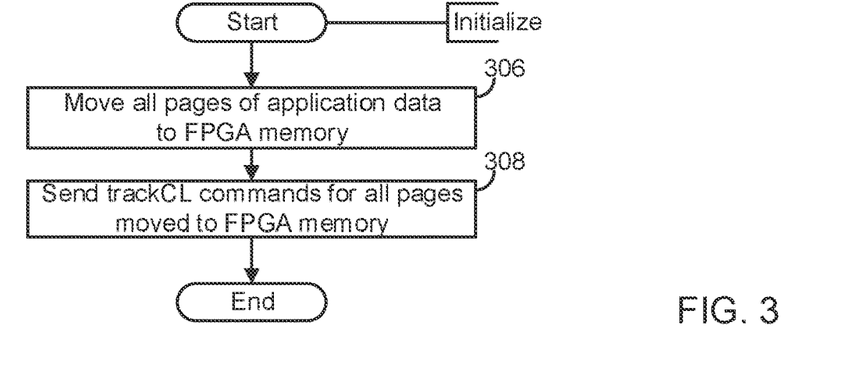
FIG. 3 depicts a flow of operations for an initialize function.

FIG. 3 depicts a flow of operations of an initialize function that is carried out by the system software. In step 306, the system software moves all data pages 240 of the application program from CPU memory 206 to FPGA memory 216. Then, in step 308, the system software issues trackCL(page) commands on the coherence interconnect for each of data pages 240 moved to cause a dataCL module, which is described below, to start tracking accesses to cache lines of these data pages.

Figure 4:
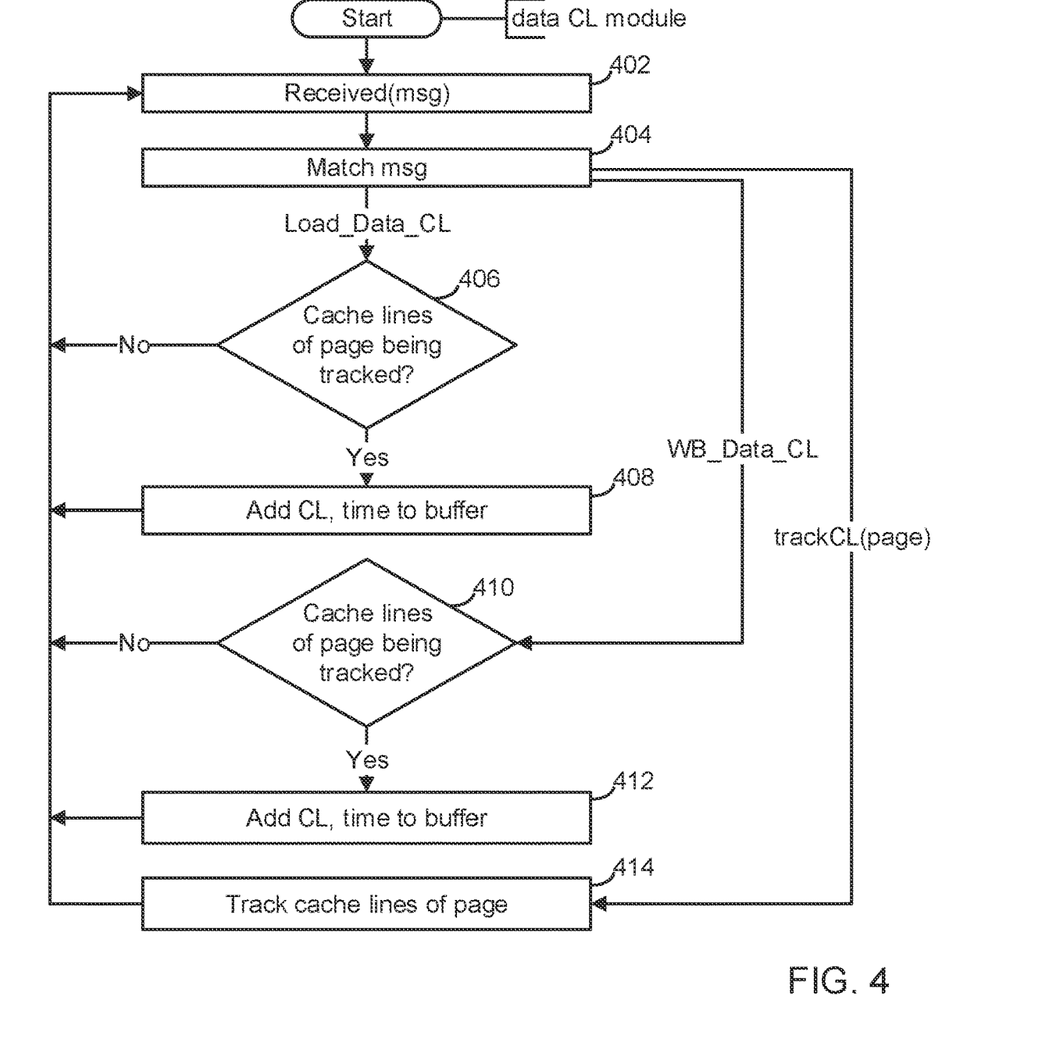
FIG. 4 depicts a flow of operations of a module that listens to activity on a coherence interconnect.

The dataCL module listens to activity on the coherence interconnect, which activity includes a 'Load_Data_CL' event and a 'WB_Data_CL' event. The 'Load_Data_CL' event indicates that a cache line is loaded into a CPU cache and the 'WB_Data_CL' event indicates that a cache line of the CPU cache is to be written back to the system memory to maintain coherence with the system memory. In one embodiment, the dataCL module is one of the application-specific modules 218.

FIG. 4 depicts a flow of operations of the dataCL module that listens to activity on a coherence interconnect. In step 402, the module receives a message and, in step 404, matches the message to one of two events on the coherence interconnect or to a message sent from other functions. If the message is a trackCL(page) command, then the module is configured in step 414 to begin tracking the cache lines of the page specified in the command. If the message is a 'Load_Data_CL' from the coherence interconnect, the module determines in step 406 whether the cache line resides in any one of the pages being tracked, as requested by trackCL commands. If so, in step 408, the module adds the cache line CL (both the address and data) and a time indicator to buffer 239, where the time indicator is a time at which the cache line was loaded into buffer 310. If the message is a 'WB_Data_CL' from the coherence interconnect, the module determines in step 410 whether the cache line resides in one of the pages being tracked. If so, in step 412, the module adds the CL (both the address and data) and a time indicator to buffer 239, where the time indicator is a time at which the cache line was loaded into buffer 310. As mentioned above, the contents of buffer 239 are analyzed to find patterns such as attack patterns in the accesses.

Figure 5:
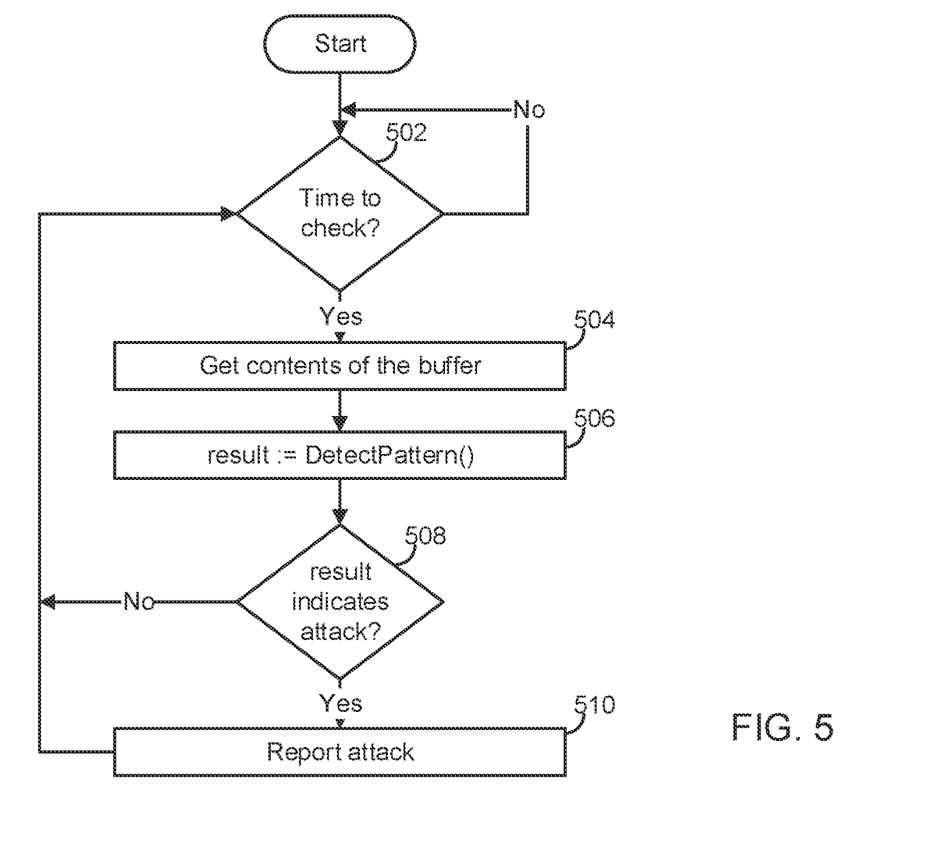
FIG. 5 depicts a flow of operations of a security program that is executed to detect potential attacks.

FIG. 5 depicts a flow of operations of a security program that is executed to detect potential attacks. The security program may be launched as an application executed by CPU 104 on top of hypervisor 111 or by CPU 154 on top of operating system 186. Referring to FIG. 5, in step 502, the security program determines whether it is time to check buffer 239. Checking buffer 239 may be prompted by the security administrator, periodically, or in response to a performance degradation of the computer system. If so, then in step 504, the security program retrieves the contents of buffer 239 and in step 506 calls the function of the security program depicted in FIG. 6 or FIG. 7 (or both), to determine if any pattern is present based on the retrieved contents of buffer 239. If so, as determined in step 508, the security program reports the attack to the security administrator in step 510.

Figure 6:
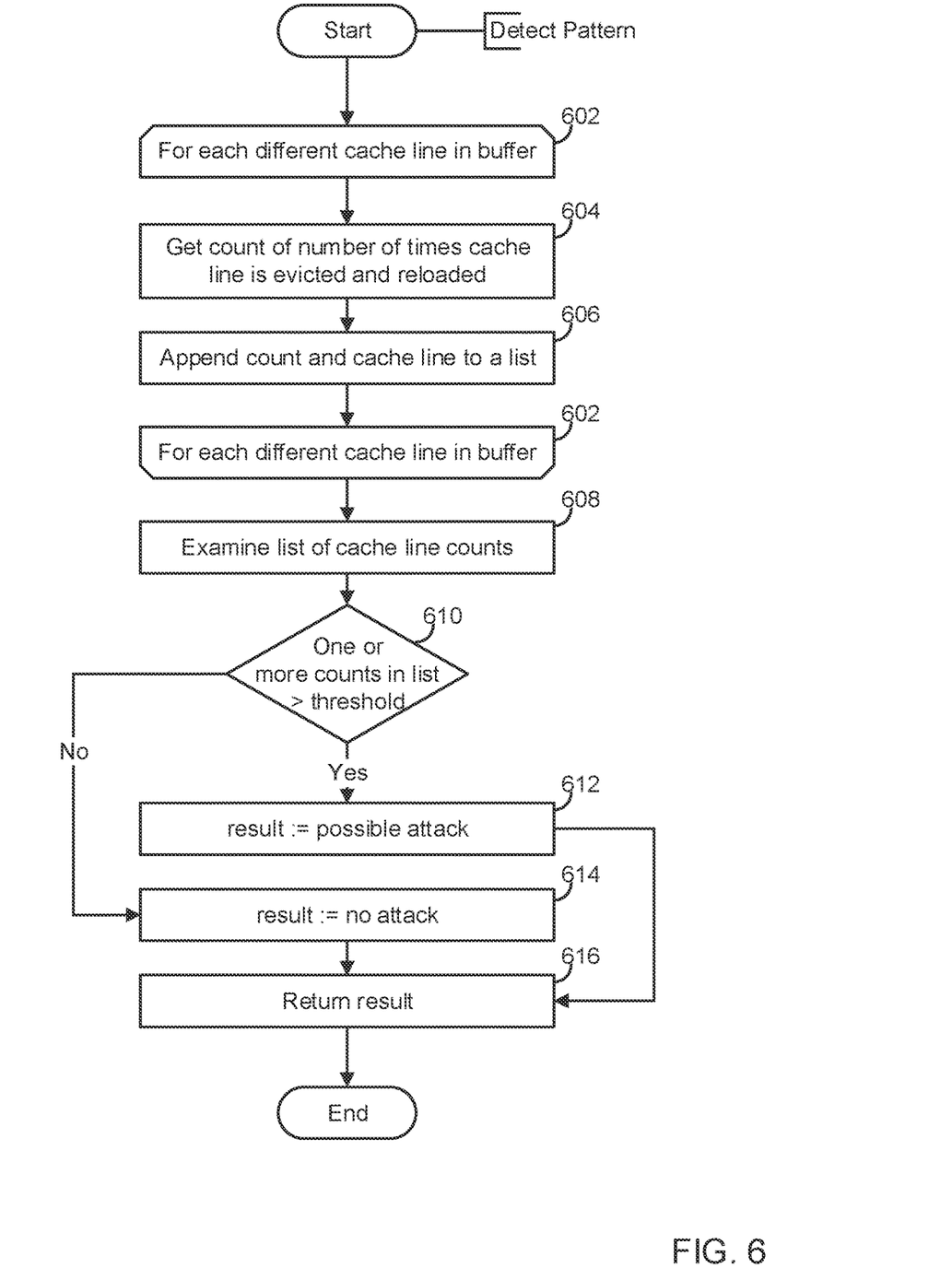
FIG. 6 depicts a flow of operations of a function to detect attacks of a first type.

FIG. 6 depicts a flow of operations of a function to detect attacks of a first type. In step 602, the function starts an iterator over each different cache line in buffer 239. For each cache line, the function counts in step 604 the number of times the cache line is evicted and reloaded from CPU caches 205. Eviction is represented by a 'WB_Data_CL' recorded in buffer 239. A reload is represented by 'Load_Data_CL' recorded in buffer 239. In step 606, the function appends the count and cache line to a list. In step 608, the function examines (i.e., scans) the list of cache line counts, and in step 610 determines whether any counts in the list exceed a given threshold. If so, then in step 612, the function stores 'possible attack' in the result. Otherwise, in step 614, the function stores 'no attack' in the result. Finally, in step 616, the function returns the result.

Figure 7:
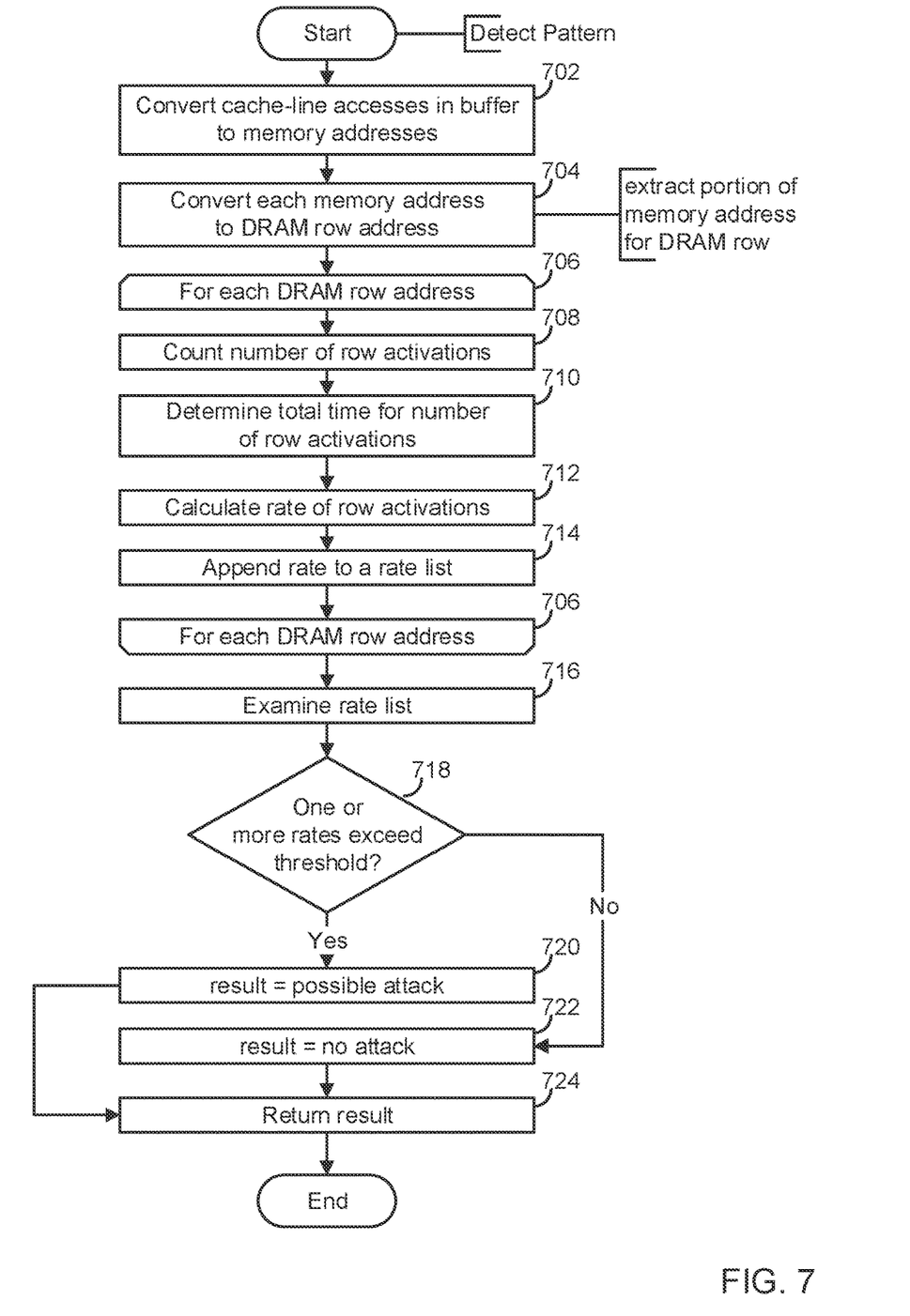
FIG. 7 depicts a flow of operations of a function to detect attacks of a second type.

FIG. 7 depicts a flow of operations of a function to detect attacks of a second type. In step 702, the function converts the cache-line accesses in buffer 239 to memory addresses. In step 704, the function converts the memory addresses to row addresses. As is well known, a row address is a portion of the memory address. In step 706, the function starts an iterator over each row address. In step 708, the function counts the number of row activations for the row, where a row activation is indicated by a 'Load_Data_CL' event or a 'WB_Data_CL' event having been recorded in buffer 239. In step 710, the function determines the total time for the determined number of row activations. The total time is computed by computing time intervals between the time indicators of relevant entries in buffer 239 and summing those time intervals. In step 712, the function calculates the rate of row activations (i.e., number of row activation/time). In step 714, the function appends the rate to a rate list. In step 716, the function examines (i.e., scans) the rate list and determines in step 718 whether one or more rates in the list exceeds a given threshold. If so, in step 720, the function sets the result to 'possible attack.' Otherwise, in step 722, the function sets the result to 'no attack.' Finally, in step 724, the function returns the result.

In conclusion, monitoring the cache lines of data pertaining to an application program, such as a virtual machine or an application, allows any pattern of memory accesses to be detected. If the pattern indicates a security attack, the attack can be reported to a security administrator, who may then take steps to stop or prevent the attack.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s).

In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of detecting a security threat in a computer system while an application program is executed on a processor of the computer system, the method comprising:
    moving all data pages of the application program that are stored in a local memory of the processor into a local memory of a device that is connected to the processor via a coherence interconnect;
    during execution of the application program by the processor, monitoring the coherence interconnect by the device, for requests to access cache lines of the data pages, and storing by the device, addresses of the accessed cache lines in a buffer; and
    determining by the processor whether a security threat exists based on contents of the buffer.

2. The method of claim 1, wherein the application program is a virtual machine running on top of a hypervisor.

3. The method of claim 1, wherein the application program is an application running on top of an operating system.

4. The method of claim 1, wherein the contents of the buffer are examined for a cache-based side-channel attack.

5. The method of claim 4, wherein the contents of the buffer are examined for the cache-based side-channel attack by counting for each cache line recorded in the buffer the number of times the cache line is evicted and reloaded and determining if the number counted for any cache line exceeds a threshold.

6. The method of claim 1, wherein the contents of the buffer are examined for a row hammer attack.

7. The method of claim 6, wherein the contents of the buffer are examined for the row hammer attack by computing for each row address corresponding to the addresses of the accessed cache lines stored in the buffer the rate of activations and determining if the rate computed for any row address exceeds a threshold.

8. A non-transitory computer-readable medium comprising instructions to be executed in a computer system in which an application program is executed on a processor and a device which is connected to the processor via a coherence interconnect monitors events on the coherence interconnect, wherein the instructions when executed in the computer system cause the computer system to carry out a method of detecting a security threat in the computer system while the application program is executed on the processor, said method comprising:
    moving all data pages of the application program that are stored in a local memory of the processor in a local memory of a device that is connected to the processor via a coherence interconnect;
    during execution of the application program by the processor, monitoring the coherence interconnect by the device, for requests to access cache lines of the data pages, and storing by the device, addresses of the accessed cache lines in a buffer; and
    determining by the processor whether a security threat exists based on contents of the buffer.

9. The non-transitory computer readable medium of claim 8, wherein the application program is a virtual machine running on top of a hypervisor.

10. The non-transitory computer readable medium of claim 8, wherein the application program is an application running on top of an operating system.

11. The non-transitory computer readable medium of claim 8, wherein the contents of the buffer are examined for a cache-based side-channel attack.

12. The non-transitory computer readable medium of claim 11, wherein the contents of the buffer are examined for the cache-based side-channel attack by counting for each cache line recorded in the buffer the number of times the cache line is evicted and reloaded and determining if the number counted for any cache line exceeds a threshold.

13. The non-transitory computer readable medium of claim 8, wherein the contents of the buffer are examined for a row hammer attack.

14. The non-transitory computer readable medium of claim 13, wherein the contents of the buffer are examined for the row hammer attack by computing for each row address corresponding to the addresses of the accessed cache lines stored in the buffer the rate of activations and determining if the rate computed for any row address exceeds a threshold.

15. A computer system comprising
a processor; and
a device connected to the processor via a coherence interconnect, the device including a local memory into which all data pages of an application program executed on the processor are moved from a local memory of the processor, wherein
the device is configured to: during execution of the application program by the processor, monitor the coherence interconnect for requests to access cache lines of the data pages, and store addresses of the accessed cache lines in a buffer, and
the processor is configured to: determine whether a security threat exists based on contents of the buffer.

16. The computer system of claim 15, wherein the application program is a virtual machine running on top of a hypervisor or an application running on top of an operating system.

17. The computer system of claim 15, wherein the contents of the buffer are examined for a cache-based side-channel attack.

18. The computer system of claim 17, wherein the contents of the buffer are examined for the cache-based side-channel attack by counting for each cache line recorded in the buffer the number of times the cache line is evicted and reloaded and determining if the number counted for any cache line exceeds a threshold.

19. The computer system of claim 15, wherein the contents of the buffer are examined for a row hammer attack.

20. The computer system of claim 19, wherein the contents of the buffer are examined for the row hammer attack by computing for each row address corresponding to the addresses of the accessed cache lines stored in the buffer the rate of activations and determining if the rate computed for any row address exceeds a threshold.

* * * * *